(12) United States Patent
Fukawatase et al.

(10) Patent No.: US 8,141,453 B2
(45) Date of Patent: Mar. 27, 2012

(54) STEERING COLUMN COVER STRUCTURE

(75) Inventors: Osamu Fukawatase, Nishikamo-gun (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 463 days.

(21) Appl. No.: 12/523,921

(22) PCT Filed: Jan. 5, 2009

(86) PCT No.: PCT/JP2009/050004
§ 371 (c)(1),
(2), (4) Date: Jul. 21, 2009

(87) PCT Pub. No.: WO2009/087982
PCT Pub. Date: Jul. 16, 2009

(65) Prior Publication Data
US 2010/0043588 A1 Feb. 25, 2010

(30) Foreign Application Priority Data

Jan. 10, 2008 (JP) .................................. 2008-003010

(51) Int. Cl.
*B62D 1/18* (2006.01)

(52) U.S. Cl. .............................. 74/493; 70/252; 280/777

(58) Field of Classification Search .................... 74/493; 70/252; 180/287; 280/777
See application file for complete search history.

(56) References Cited

U.S. PATENT DOCUMENTS

| 3,673,829 | A | * | 7/1972 | Mizuno ........................... 70/252 |
| 4,411,331 | A | | 10/1983 | Hanada |
| 4,442,688 | A | * | 4/1984 | Saegusa ......................... 70/252 |
| 4,723,461 | A | * | 2/1988 | Yoshida et al. ................. 74/493 |
| 4,790,406 | A | * | 12/1988 | Ferrell et al. .................. 180/287 |
| 2007/0182134 | A1 | | 8/2007 | Mizuno et al. |

FOREIGN PATENT DOCUMENTS

| JP | U-56-171379 | 12/1981 |
| JP | U-61-16972 | 1/1986 |
| JP | Y2-1-25109 | 7/1989 |
| JP | U-2-147376 | 12/1990 |
| JP | U-3-5677 | 1/1991 |
| JP | U-5-78665 | 10/1993 |
| JP | A-7-186971 | 7/1995 |
| JP | A-9-104317 | 4/1997 |
| JP | A-2002-37003 | 2/2002 |
| JP | A-2006-168426 | 6/2006 |
| JP | A-2007-131082 | 5/2007 |
| JP | A-2007-137297 | 6/2007 |
| JP | A-2007-203937 | 8/2007 |

\* cited by examiner

*Primary Examiner* — William C Joyce
(74) *Attorney, Agent, or Firm* — Oliff & Berridge, PLC

(57) ABSTRACT

When a steering column contracts in order to absorb shock, interference between a column cover and a lock apparatus is suppressed, and a shock-absorbing stroke of the steering column is obtained. When a steering column contracts in order to absorb shock as a result of an input load equal to or greater than a predetermined value, a column cover that covers a rear end side of steering column, performs a stroke, together with a movable side region, relative to an outer tube (a fixed side region) of steering column, to which is fixed a lock apparatus. At this time, a side wall portion of column cover, which is positioned further to a vehicle rear than lock apparatus, enters between lock apparatus and outer tube of steering column, thereby suppressing interference between column cover and lock apparatus.

8 Claims, 3 Drawing Sheets

STEERING COLUMN COVER STRUCTURE

TECHNICAL FIELD

The present invention relates to a steering column cover structure.

BACKGROUND ART

A telescopic steering apparatus in which a steering wheel can be adjustably positioned in an axial direction of a steering shaft is disclosed in which, together with extension and contraction of an upper shaft with respect to the steering shaft, an upper column cover extends and contracts with respect to a lower column cover (see Patent Document 1 and Patent Document 2).

Patent Document 1: Japanese Utility Model Application Publication (JP-Y) No. 1-25109
Patent Document 2: Japanese Utility Model Application Laid-Open (JP-U) No. 5-78665

DESCRIPTION OF THE INVENTION

Problem to be Solved by the Invention

However, in the above prior art, no consideration has been given to a contraction function of the steering column for absorbing shock when a load equal to or greater than a predetermined value is inputted to the steering wheel, which is a function that generally accompanies a telescopic function for adjusting the front/rear position of a steering wheel. Further, although a steering lock apparatus (hereinafter sometimes "lock apparatus") which is a combination of a key cylinder and an ignition switch, is generally provided at a steering column, no particular consideration has been given to the lock apparatus.

The present invention takes the above issues into consideration, and aims to suppress interference between a column cover and a lock apparatus when a steering column contracts in order to absorb shock, and obtain a shock-absorbing stroke of a steering column.

Means for Solving the Problem

In a first embodiment of the invention, a steering column cover structure includes a column cover that covers a rear end side of a steering column, the steering column being able to contract as a result of an input load of a predetermined value or greater and having a lock apparatus fixed thereto at a fixed side region which is fixed when the steering column contracts, the column cover being fixed at a movable side region which is movable when the steering column contracts, and the column cover comprising a side wall portion which is positioned further towards a vehicle rear than the lock apparatus and which can enter between the lock apparatus and the fixed side region of the steering column when the steering column contracts.

In the steering column cover structure according to the first embodiment, when a steering column contracts to absorb shock when a load equal to or greater than a predetermined value is input thereto, a column cover that covers a rear end side of the steering column, together with a movable region, performs a stroke relative to a fixed side region of the steering column at which a lock apparatus is fixed. At this time, a side wall portion, positioned further to a vehicle rear than the lock apparatus of the steering column, enters between the lock apparatus and a fixed side region of the steering column, thereby suppressing interference between the column cover and the lock apparatus. As a result, a shock-absorbing stroke of the steering column can be obtained.

In a second embodiment of the invention, a steering column structure further comprises a key hole cover which is separate from the column cover, and which is fixed to the lock apparatus such that the key hole cover covers an edge portion of a key hole which is formed in the column cover in correspondence with a key insertion portion of the lock apparatus.

In the steering column structure according to the second embodiment, a key hole cover, which covers an edge portion of a key hole formed in the column cover, is formed separately from the column cover, and is fixed to the lock apparatus. Thereby, when a steering column contracts to absorb shock, the column cover separates from the key hole cover and, together with a movable side region of the steering column, performs a stroke relative to a fixed side region of the steering column. As a result, even if a key hole cover is provided at an edge portion of a key hole of a column cover, interference between the column cover and the lock apparatus can be suppressed, and a shock-absorbing stroke of the steering column can be obtained.

Effects of the Invention

As described above, the steering column cover structure according to the first embodiment can achieve the excellent effects of suppressing interference between a column cover and a lock apparatus when a steering column contracts in order to absorb shock, and obtaining a shock-absorbing stroke of a steering column.

The steering column cover structure according to the second embodiment can achieve the excellent effects of suppressing interference between a column cover and a lock apparatus even if a key hole cover is provided at an edge portion of a key hole of a column cover, and obtaining a shock-absorbing stroke of the steering column.

BEST MODE FOR IMPLEMENTING THE INVENTION

Figure 1:
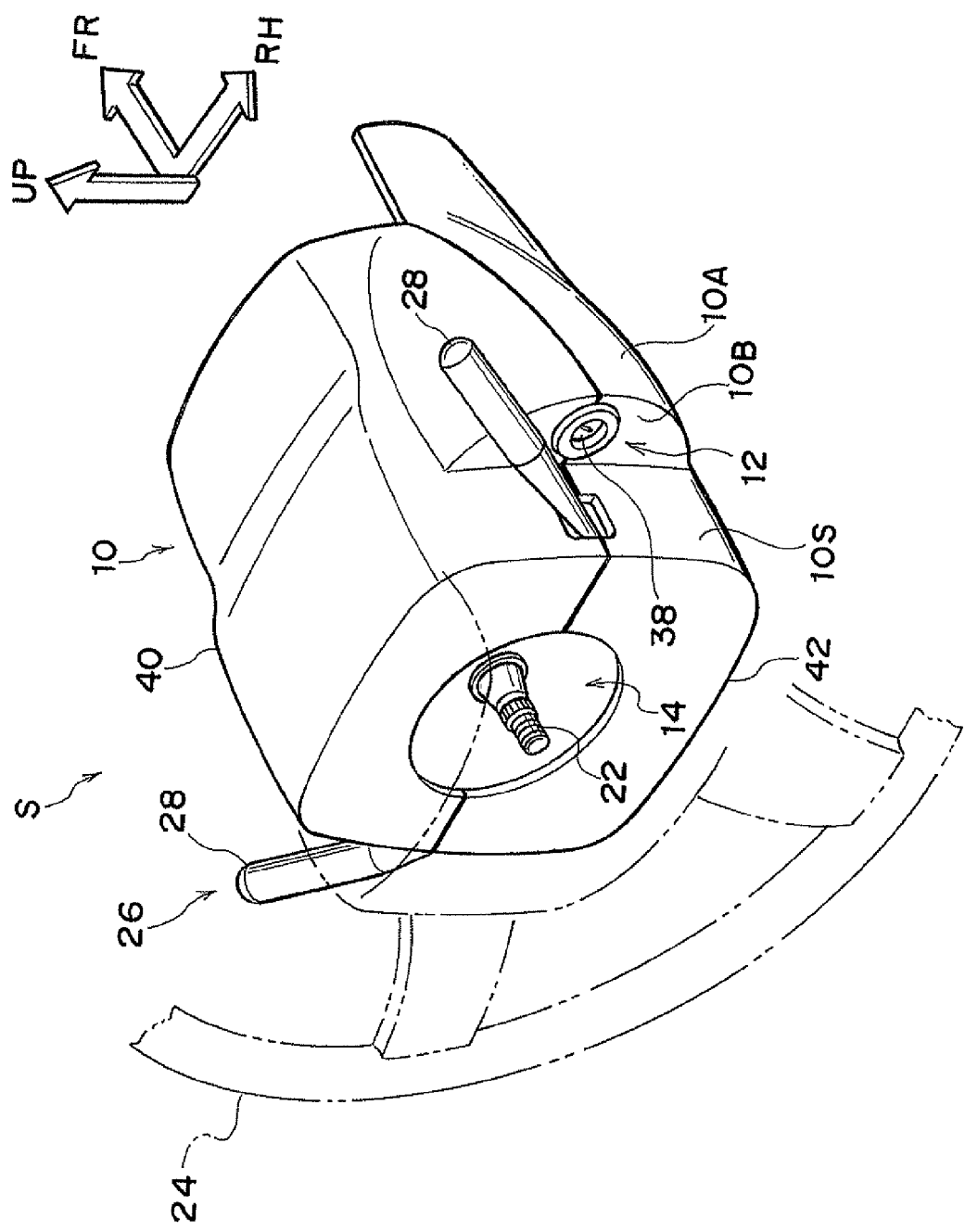
FIG. 1 is a perspective view showing a steering column cover structure.

Exemplary embodiments of the present invention will be described below with reference to the drawings. In FIG. 1, steering column cover structure S according to the present embodiment includes column cover 10.

Figure 2:
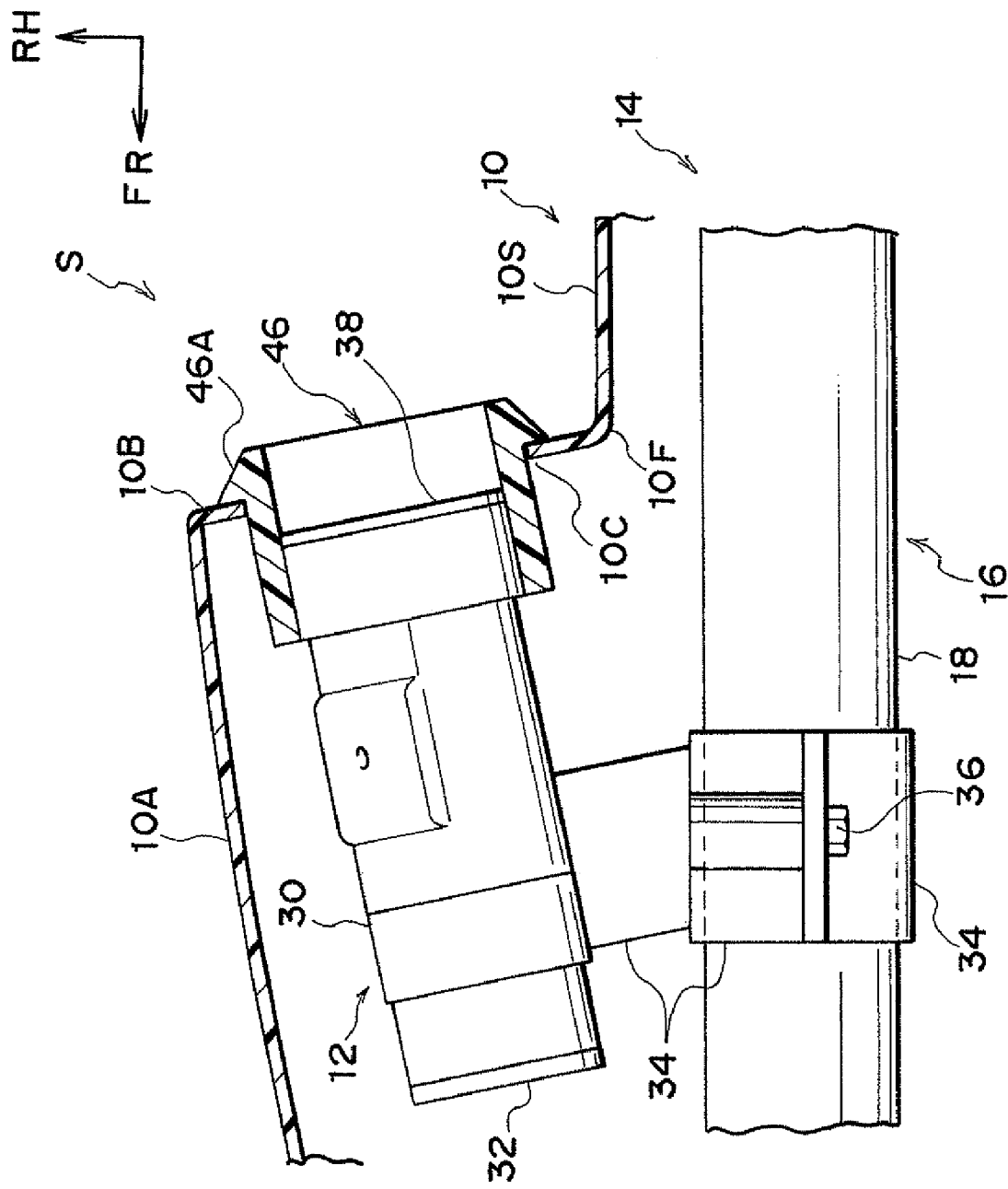
FIG. 2 is an enlarged sectional view showing a structure in a vicinity of a lock apparatus in a steering column cover structure.

With reference to FIG. 1 and FIG. 2, column cover 10 covers a rear end side of a steering column 14, which can contract as a result of an input load equal to or greater than a predetermined value, and includes a lock apparatus 12 fixed thereto at a fixed side region which is fixed when the steering column 14 contracts. Column cover 10 is fixed at a movable side region which is movable when steering column 14 contracts, and is configured such that a side wall portion 10S, which is positioned further to a vehicle rear than lock apparatus 12, can enter between lock apparatus 12 and the fixed side region of steering column 14 when steering column 14 contracts.

Next, an explanation will be given of an example of the structure of steering column 14. Steering column 14, is, for example, a part of a steering mechanism for a small car, and includes a steering main shaft 22 arranged at an axial core portion (see FIG. 1), a column tube 16 which covers steering main shaft 22 and which is supported by the vehicle (see FIG. 2), and a telescopic mechanism (not shown). As shown in FIG. 1, at a rear end portion of steering main shaft 22, a steering wheel 24 is fixed with a lock nut (not shown).

As shown in FIG. 2, column tube 16 includes an outer tube 18, which is a fixed side region when steering column 14 contracts as a result of an input load equal to or greater than a predetermined value, and an inner tube (not shown) which is a movable side region. Steering main shaft 22 and column tube 16, when being adjusted by a telescopic mechanism, and when a load equal to or greater than a predetermined value acts from a steering wheel 24 side to an axial direction front side with respect to steering main shaft 22, each contract in an axial direction within the range of a predetermined stroke. Specifically, steering main shaft 22, which is a movable side region, and an inner tube perform a stroke (move in an axial direction) relative to outer tube 18, which is a fixed side region.

In FIG. 1, a combination switch 26 is provided near to a rear end portion of column tube 16. Combination switch 26 includes a circular main body portion (not shown) provided at an outer peripheral portion near the rear end portion of column tube 16, and a pair of left and right operation bars 28 that project from both sides of the main body portion and are disposed so as to pass through column cover 10. The configurations of steering column 14 and combination switch 26, are, however, not limited to the configurations described above or the examples shown in the drawings.

As shown in FIG. 2, a lock apparatus 12 is projectingly provided at one side in a vehicle width direction, such as a right side in a vehicle width direction, of outer tube 18 of column tube 16. Lock apparatus 12 is combined with, for example, a key cylinder 30 and an ignition switch 32, and is attached to outer tube 18 by fixing a circular attachment portion 34 to outer tube 18 with, for example, a bolt 36.

Compared with a standard key cylinder (not shown) which extends downward and inclined from steering column 14, key cylinder 30 is provided at an angle such that it is almost parallel with an axial direction of steering column 14. Thus, as shown in FIG. 1, key insertion portion 38 of lock apparatus 12 faces substantially towards the rear of the vehicle. This is because, in a small vehicle, in order to obtain sufficient vehicle interior space, the projection amount of steering column 14 projects from an instrument panel (not shown) is limited, and if key cylinder 30 was provided in a standard manner, it would be difficult to expose key insertion portion 38 to a passenger side.

When a predetermined key operation is performed with respect to lock apparatus 12, a pin or the like (not shown) is engaged with steering main shaft 22, and rotation of steering main shaft 22 can be locked.

Next, the structure of column cover 10 will be explained. As shown in FIG. 1, column cover 10, which may be formed from a synthetic resin, comprises a column upper cover 40 and a column lower cover 42 which are combined in substantially a tube shape, and may be fixed to an inner tube of column tube 16, or combination switch 26 provided to the inner tube. At column cover 10 is provided a lock cover portion 10A, which extends further to the right in a vehicle width direction than side wall portion 10S so as to cover lock apparatus 12 which projects from steering column 14 towards a right hand side in a vehicle with direction. Rear-facing surface 10B of lock cover portion 10A faces an approximate rear of the vehicle, similar to key insertion portion 38 of lock apparatus 12. At a meeting portion at rear-facing surface 10B where column upper cover 40 meets column lower cover 42, there is formed a key hole 10C such that a key 44 (see FIG. 3) can be inserted into and removed from key insertion portion 38 of lock apparatus 12.

As shown in FIG. 2, steering column cover structure S of the present embodiment includes a keyhole cover 46 fixed to lock apparatus 12 so as to cover an edge portion of key hole 10C at column cover 10. Keyhole cover 46 may be formed from a synthetic resin and can be used, for example, to improve the appearance of an area around key insertion portion 38. Specifically, keyhole cover 46 is a circular tube-shaped member having an inner diameter that fits around an outer diameter of key cylinder 30 of lock apparatus 12, such that keyhole cover 46 may be fixed thereto, and having an outer diameter such that keyhole cover 46 may be inserted into key hole 10C.

At a vehicle rear side end portion of keyhole cover 46 is formed a flange portion 46A that covers an edge portion of key hole 10C. Flange portion 46A overhangs towards a diametrical direction outer side of key hole 10C, and is configured such that when keyhole cover 46 is inserted into column cover 10 from key hole 10C, and fits around a rear end portion of key cylinder 30 of lock apparatus 12, it may cover an edge portion of key hole 10C from a rear-facing surface 10B side (see FIG. 1). Keyhole cover 46 may also have a structure that emits light in a ring shape via a light-emitting body (not shown).

As shown in FIG. 2, side wall portion 10S of column cover 10 extends in an axial direction of steering column 14 at a vehicle width direction right side of steering column 14. The position of side wall portion 10S in a vehicle width direction is between key cylinder 30 of lock apparatus 12 and outer tube 18 of column tube 16 of steering column 14. Referring to the sectional positions shown in FIG. 2, front end 10F of side wall portion 10S meets a steering column 14 side end portion of rear-facing surface 10B of lock cover portion 10A, and it is configured such that there is no interference between front end 10F and attachment portion 34 of lock apparatus 12.

Operation

Figure 3:
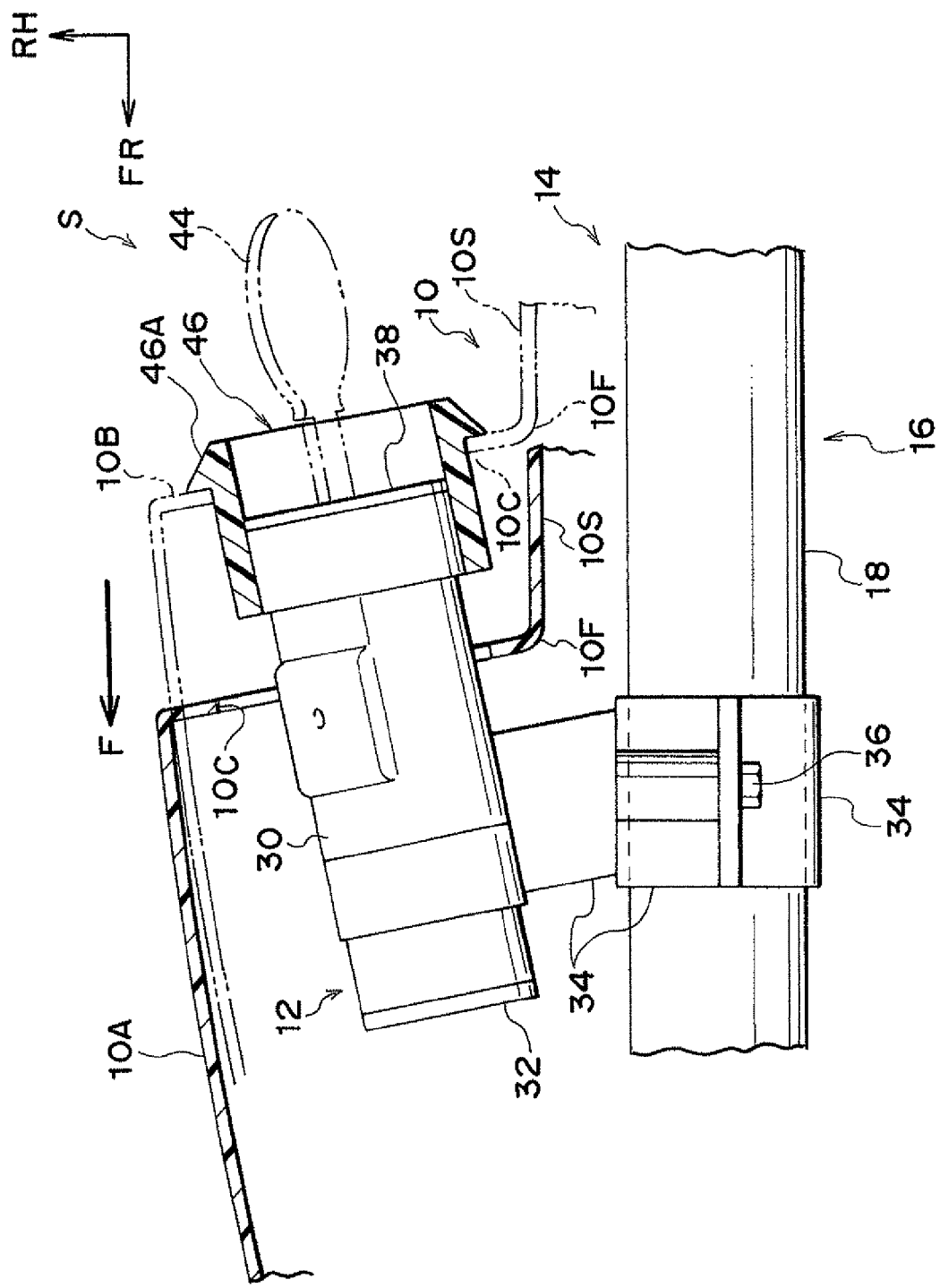
FIG. 3 is an enlarged sectional view showing a state in which, when a steering column contracts, a side wall portion of a column cover enters between a key cylinder of a lock apparatus and an outer tube.

The present embodiment is configured as above, and an explanation of the operation thereof is given below. Referring to FIG. 1, at steering column cover structure S according to the present embodiment, when a load equal to or greater than a predetermined value is applied from a steering wheel 24 side to steering main shaft 22 towards a front side in an axial direction, steering column 14 contracts to absorb the shock thereof. At this time, as shown in FIG. 3, column cover 10, which covers a rear end side of steering column 14, performs a stroke (moves in an axial direction) in the direction of arrow F, together with a movable side region including an inner tube and combination switch 26, steering wheel 24 and the like, relative to outer tube 18 which is a fixed side region of steering column 14.

Here, lock apparatus 12 is fixed to outer tube 18 which is a fixed side region, key cylinder 30 is positioned at an angle substantially parallel to an axial direction of steering column 14, and there is no interference between front end 10F of side wall portion 10S of column cover 10 and attachment portion 34 of lock apparatus 12. Therefore, when steering column 14 contracts, side wall portion 10S can enter between lock apparatus 12 and outer tube 18. As a result, when steering column 14 contracts to absorb shock, interference between side wall portion 10S of column cover 10 and key cylinder 30 of lock apparatus 12 can be suppressed, and thereby, a shock-absorbing stroke of steering column 14 can be obtained. This shock-absorbing stroke may be set to, for example, around 30 mm.

In steering column cover structure S, keyhole cover 46, which covers an edge portion of key hole 10C formed in column cover 10, is formed separately from column cover 10, and fixed to key cylinder 30 of lock apparatus 12. Thereby, when steering column 14 contracts to absorb shock, column cover 10 separates from keyhole cover 46 and performs a stroke relative to a fixed portion side region (outer tube 18 and the like) of steering column 14, together with a movable region (an inner tube and the like) of steering column 14. As a result it is possible to suppress interference between column cover 10 and lock apparatus 12, as well as obtain a shock-absorbing stroke of steering column 14, even when keyhole cover 46 is provided to an edge portion of key hole 10C of column cover 10.

In the above embodiment, keyhole cover 46 is provided, however, this is not limiting, and a configuration in which keyhole cover 46 is not provided is also possible. Further, side wall portion 10S of column cover 10 is not limited to being flat, and may be curved when seen in a sectional view along a direction perpendicular to an axial direction of steering column 14. Further, in a vehicle frontal collision, in order to restrain a knee portion of a vehicle occupant sitting in a driver's seat, a knee airbag may be provided in column cover 10.

REFERENCE NUMERALS

10 Column cover
10C Key hole
10F Front end
10S Side wall portion
12 Lock apparatus
14 Steering column
18 Outer tube (fixed side region)
22 Steering main shaft (movable side region)
26 Combination switch (movable side region)
30 Key cylinder
34 Attachment portion
38 Key insertion portion
46 Keyhole cover
46A Flange portion
S Steering column cover structure

What is claimed is:

1. A steering column cover structure, comprising a column cover that covers a rear end side of a steering column, the steering column being able to contract as a result of an input load equal to or greater than a predetermined value and having a lock apparatus fixed thereto at a fixed side region which is fixed when the steering column contracts, the column cover being fixed at a movable side region which is movable when the steering column contracts, and the column cover comprising a side wall portion which is positioned further towards a vehicle rear than the lock apparatus and which can enter between the lock apparatus and the fixed side region of the steering column when the steering column contracts.

2. The steering column structure of claim 1, further comprising a key hole cover which is separate from the column cover, and which is fixed to the lock apparatus such that the key hole cover covers an edge portion of a key hole which is formed in the column cover in correspondence with a key insertion portion of the lock apparatus.

3. The steering column structure of claim 2, wherein the key hole cover has an inner diameter such that it can fit around an outer diameter of a key cylinder of the lock apparatus and be fixed thereto, and has an outer diameter such that it can be inserted in the key hole.

4. The steering column structure of claim 3, wherein the key hole cover comprises a flange portion that covers an edge portion of the key hole, and the key hole cover can be inserted into the column cover from the key hole, and fits around a rear end portion of the key cylinder and is fixed thereto.

5. The steering column structure of claim 4, configured such that there is no interference between a front end of the side wall portion and an attachment portion that attaches the lock apparatus to the fixed side region.

6. The steering column structure of claim 2, configured such that there is no interference between a front end of the side wall portion and an attachment portion that attaches the lock apparatus to the fixed side region.

7. The steering column structure of claim 3, configured such that there is no interference between a front end of the side wall portion and an attachment portion that attaches the lock apparatus to the fixed side region.

8. The steering column structure of claim 1, configured such that there is no interference between a front end of the side wall portion and an attachment portion that attaches the lock apparatus to the fixed side region.

* * * * *